US012614375B2

(12) United States Patent
Zhang et al.

(10) Patent No.: US 12,614,375 B2
(45) Date of Patent: Apr. 28, 2026

(54) REMOTE SENSING CLASSIFICATION METHOD BASED ON RELATIVE ENTROPY

(71) Applicant: Henan University, Kaifeng (CN)

(72) Inventors: Xiwang Zhang, Kaifeng (CN); Jianfeng Liu, Kaifeng (CN); Shiqi Yu, Kaifeng (CN); Hao Zhao, Kaifeng (CN); Mengwei Chen, Kaifeng (CN)

(73) Assignee: HENAN UNIVERSITY, Kaifeng (CN)

( * ) Notice: Subject to any disclaimer, the term of this patent is extended or adjusted under 35 U.S.C. 154(b) by 281 days.

(21) Appl. No.: 18/475,223

(22) Filed: Sep. 27, 2023

(65) Prior Publication Data

US 2024/0242477 A1     Jul. 18, 2024

(30) Foreign Application Priority Data

Jan. 13, 2023     (CN) .......................... 202310061696.8

(51) Int. Cl.
*G06V 10/764*          (2022.01)
*G06V 10/75*           (2022.01)
*G06V 10/77*           (2022.01)

(52) U.S. Cl.
CPC .......... *G06V 10/764* (2022.01); *G06V 10/751* (2022.01); *G06V 10/7715* (2022.01)

(58) Field of Classification Search
CPC ............... G06V 10/764; G06V 10/751; G06V 10/7715; G06V 20/13; G06V 20/188; G06V 10/58; G06V 10/62; G06V 10/765; G06V 20/194; Y02A 90/10
See application file for complete search history.

(56) References Cited

U.S. PATENT DOCUMENTS

2022/0261928 A1* 8/2022 Malizia .................. G06N 20/20

OTHER PUBLICATIONS

Giri, Chandra, and Bradley Reed Zhiliang Zhub. "A comparative analysis of the Global Land Cover 2000 and MODIS land cover data sets." Remote Sensing of Environment 94 (2005): 123-132 (Year: 2005).*

(Continued)

*Primary Examiner* — Andrew M Moyer

(57) ABSTRACT

A remote sensing classification method based on relative entropy includes: determining sample points of n types of ground objects in a study area and determining series remote sensing parameters; extracting, based on the sample points, remote sensing parameter values to form standard time series plots as a first distribution; taking remote sensing parameter values of to-be-classified pixels as a second distribution, determining, based on the second distribution and the first distribution, KL values of the to-be-classified pixels by using a KL-divergence formula, then obtaining n KL layers; and comparing n KL values of each to-be-classified pixel to classify it to be a type of ground objects with a minimum KL value. The method utilizes variation characteristics of ground objects in series and tightly combines with KL-divergence possessing obvious advantages in measuring probability distribution similarity, thereby achieving better classification and recognition on ground object types and improving classification accuracy.

9 Claims, 5 Drawing Sheets

(56)        References Cited

OTHER PUBLICATIONS

Zhang, Xiwang, Fang Qiu, and Fen Qin. "Identification and mapping of winter wheat by integrating temporal change information and Kullback-Leibler divergence." International Journal of Applied Earth Observation and Geoinformation 76 (2019): 26-39. (Year: 2019).*

Wang, Jun, et al. "Land cover changing pattern in pre-and post-earthquake affected area from remote sensing data: A case of Lushan County, Sichuan Province." Land 11.8 (2022): 1205 (Year: 2022).*

Pérez-Hoyos, Ana, et al. "Comparison of global land cover datasets for cropland monitoring." Remote Sensing 9.11 (2017): 1118 (Year: 2017).*

* cited by examiner

REMOTE SENSING CLASSIFICATION METHOD BASED ON RELATIVE ENTROPY

TECHNICAL FIELD

The disclosure relates to the field of remote sensing monitoring technologies, particularly to a remote sensing classification method based on relative entropy (also referred as to Kullback-Leibler divergence abbreviated as KL divergence).

BACKGROUND

Currently, classification methods for classifying ground objects by using a remote sensing technology are mainly divided into a classification method based on spectral information and a classification method based on temporal variation characteristics.

The classification method based on spectral information is mainly used for medium to high resolution optical images, and a principle thereof is to determine a similarity between to-be-classified pixels and samples by using statistical characteristics of pixel values. If medium to high resolution remote sensing data covering a study area can be obtained within an ideal time phase, a classification result with high classification accuracy can be obtained. However, an acquisition of optical images is seriously affected by weather conditions and revisit cycles. Under conditions such as thick cloud coverage, even if a satellite passes by, the remote sensing data cannot be obtained by the satellite. Therefore, even if remote sensing satellite constellations are existed, it is difficult to guarantee that the acquisition of remote sensing images covering the entire study area can be acquired at a specific time.

The classification method based on temporal variation characteristics is mainly used for the remote sensing images and products based on time series, and a main principle thereof is to achieve the classification by using differences in the temporal variations of different types of ground objects. However, remote sensing data obtained by the classification method based on temporal variation characteristics is usually low in spatial resolution, which finally results in low classification accuracy. Therefore, many researchers begin to study mixed pixel decomposition by integrating the spectral information and the temporal variation characteristics. However, even though this method usually obtains abundance maps, which can improve an accuracy of quantity, it cannot specifically describe a spatial distribution of the ground objects within the pixels. As such, this method still has great inconvenience in its application.

Kullback-Leibler (KL) divergence is a measure used in probability and information theory to measure a difference between two probability distributions. The KL divergence has been introduced into remote sensing image classification, which achieves a good effect. For example, the KL divergence is combined with temporal variation information to carry out a research on winter wheat recognition. Due to a prominent advantage of the KL divergence in measuring the difference between different distributions, classification results of the research have higher accuracy compared to other conventional methods. However, a disadvantage of this method introduced with the KL divergence is that the identification research is conducted on only one kind of crops, without considering the identification of multiple crop types or ground object types simultaneously.

In the related art, using the remote sensing images to monitor the ground object types is a relatively fast and intuitive technical means, while the various technical means in the related art have inherent advantages and disadvantages. Conventional classification methods, especially a parameterized classification method, generally assume that the ground objects have normal distribution characteristics, which is impractical for high-dimensional data, such as time series data. In addition, common similarity matching classification methods focus on morphological traits of curves, which is relatively more complex. However, the KL divergence does not pay attention to whether the curves have the normal distributions and the morphological traits. Furthermore, the KL divergence uses methods of the information theory and the probability to determine a "distance" between the to-be-classified pixels and their real distributions, which has strong sensitivity. Therefore, a new data method is urgent to be introduced, thereby obtaining accurate monitoring data. However, in the related art, it is not found a classification research on the multiple types of ground objects by integrating remote sensing temporal information and the KL divergence.

SUMMARY

In response to technical problems that an existing remote sensing conventional classification method based on spectral information requires to have specific assumptions, a temporal matching method thereof pays too much attention on morphological traits, and an application thereof has too many inconveniences, the disclosure provides a remote sensing classification method based on relative entropy (also referred as to Kullback-Leibler divergence abbreviated as KL divergence). The disclosure utilizes remote sensing temporal information combined with the KL divergence for classification and identification of ground object types, which has no mandatory assumptions and utilizes methods of probability and information theory to determine a distance between two distributions to identify ground object types. Furthermore, any data that can form parameter series reflecting characteristics of the ground objects (i.e., time-series parameters reflecting growth characteristics of the ground objects) can be applied in the disclosure, and therefore, the method provided by the disclosure is more convenient and flexible compared with a conventional method.

In order to achieve the above purpose, a technical solution of the disclosure is implemented as follows.

The disclosure utilizes remote sensing data of time series to generate temporal remote sensing information, such as a time series vegetation index. Sample points for each type of to-be-classified ground objects are determined and the sample points are required to be pure pixels under a preset scale. And then, average values of the pure pixels for each type of to-be-classified ground objects are obtained to generate a standard time series plot corresponding to the corresponding type of to-be-classified ground objects. Based on the standard time series plot of each type of ground objects, KL values of the to-be-classified pixels corresponding to each type of ground objects are calculated by using a KL-divergence formula based on the corresponding standard time series plot of each type of ground object; and finally, the KL values of the pure pixel relative to the to-be-classified ground objects are compared, and then the pure pixel is classified to a type of ground objects with a minimum KL value, thereby obtaining classification and recognition results.

A remote sensing classification method based on relative entropy is provided by the disclosure, including the following steps:

step 1, determining sample points corresponding to n types of ground objects in a study area, and determining series remote sensing parameters that are used to identify characteristics of the n types of ground objects;

step 2, extracting, based on the sample points, remote sensing parameter values corresponding to each type of the n types of ground objects from the series remote sensing parameters, obtaining a standard time series plot of each type of the n types of ground objects according to the extracted remote sensing parameter values, and taking the standard time series plots of the n types of ground objects as a first distribution;

step 3, taking remote sensing parameter values corresponding to to-be-classified pixels of the study area as a second distribution, determining, based on the second distribution and the first distribution, Kullback-Leibler (KL) values of the to-be-classified pixels corresponding to each type of the n types of ground objects by using a KL-divergence formula, and obtaining n KL layers of the study area according to the KL values of the to-be-classified pixels corresponding to the n types of ground objects; and step 4, comparing n KL values of each of the to-be-classified pixels, and classifying the to-be-classified pixel to be a type of ground objects with a minimum KL value of the n KL values, and thereby obtaining classification results of the study area.

In an embodiment, the series remote sensing parameters include time series remote sensing parameters for characterizing phase differences in growth and development of vegetation types or series data formed by hyperspectral data reflecting spectral curve differences among the n types of ground objects.

In an embodiment, the time series remote sensing parameters are obtained from normalized difference vegetation index (NDVI) data of moderate-resolution imaging spectroradiometer (MODIS) and the series data are obtained from the NDVI data of MODIS added with blue band reflectance, red band reflectance, and near infrared band reflectance.

In an embodiment, a method for obtaining the standard series plot in the step 2 includes the following steps:

step 21, obtaining pure pixel samples corresponding to the n types of ground objects according to field survey data or research experience;

step 22, extracting, based on the obtained pure pixel samples, the remote sensing parameter values corresponding to each type of the n types of ground objects from the series remote sensing parameters; and step 23, calculating an average value of the remote sensing parameter values corresponding to each type of the n types of ground objects, and obtaining the standard time series plot of each type of the n types of ground objects according to the average value.

In an embodiment, the n types of ground objects include an evergreen forest, a deciduous forest, a closed shrubland, an open shrubland, a woody savanna, a savanna, a grassland, an agricultural land, a water, and a bare area; and different growth characteristics of different vegetation types are characterized in differences of variation laws of peaks and valleys of corresponding standard time series plots and differences of NDVI values of the corresponding standard time series plots.

In an embodiment, the KL-divergence formula is expressed as follows:

$$D_{KL}(P \| Q) = \sum_{i}^{n} P(i) \log \frac{P(i)}{Q(i)},$$

where P represents the first distribution, that is, the standard time series plot of each type of the n types of ground objects; Q represents the second distribution, that is, a data series corresponding to each of the to-be-classified pixels; i represents a series number of the first distribution and the second distribution; and n represents the n types of ground objects in a classification system; and a KL value is an average value of a forward KL-divergence and a reverse KL-divergence and a calculation formula of the KL value is expressed as follows:

$$KL = (D_{KL}(P \| Q) + D_{KL}(Q \| P))/2,$$

where KL represents the KL value, and $D_{KL}(P\|Q)$ and $D_{KL}(Q\|P)$ represent the forward KL-divergence and the reverse KL-divergence, respectively.

In an embodiment, the KL values corresponding to each type of the n types of ground objects are used to form a layer or band with same row and column numbers as the series remote sensing parameters, and the KL values of the to-be-classified pixels corresponding to a type of the n types of ground objects are calculated to obtain a KL data layer of the corresponding type of ground objects, as the KL layer.

In an embodiment, for each to-be-classified pixel, the n KL values are compared, and then the to-be-classified pixel is classified to the type of ground objects with the minimum KL value.

Furthermore, the remote sensing classification method based on relative entropy provided by the disclosure further includes the following steps: marking, based on the classification results, the n types of ground objects in a map of the study area for representing a distribution of the n types of ground objects in the study area and for guiding land planning, surface detection, and disaster relief of the study area. Therefore, the remote sensing classification method based on relative entropy provided by the disclosure is integrated into a practical application.

Compared with the related art, the disclosure has the following beneficial effects: the disclosure makes full use of variation characteristics of the ground objects in the series, such as the time series or spectral series, etc. and closely combines the KL-divergence possessing obvious advantages in measuring probability distribution similarity, thereby achieving better classification and identification of the n types of ground objects and improving classification accuracy. The disclosure introduces the KL-divergence into remote sensing classification research, which provides a new research perspective for the remote sensing classification, is suitable for the remote sensing data capable of reflecting characteristics of the various types of ground objects on different scales and forming the series, and is also easy to apply in actual monitoring on a certain area scale. Therefore, the disclosure has good popularization and application values.

BRIEF DESCRIPTION OF DRAWINGS

In order to more clearly illustrate embodiments of the disclosure or technical solutions in the related art, attached drawings that need to be used in the embodiments or the related art are briefly described below, and it is obvious that the attached drawings in the following description are merely some of the embodiments of the disclosure, and those skilled in the related art may obtain other drawings according to these attached drawings without involving any inventive effort.

DETAILED DESCRIPTION OF EMBODIMENTS

The technical solutions in the embodiments of the disclosure will be clearly and completely described below with reference to the attached drawings in the embodiments of the disclosure. Apparently, the described embodiments are merely some of the embodiments of the disclosure and are not all of the embodiments of the disclosure. All other embodiments obtained by those skilled in the related art based on the embodiments of the disclosure without creative efforts shall fall within the scope of the protection of the disclosure.

Figure 1:
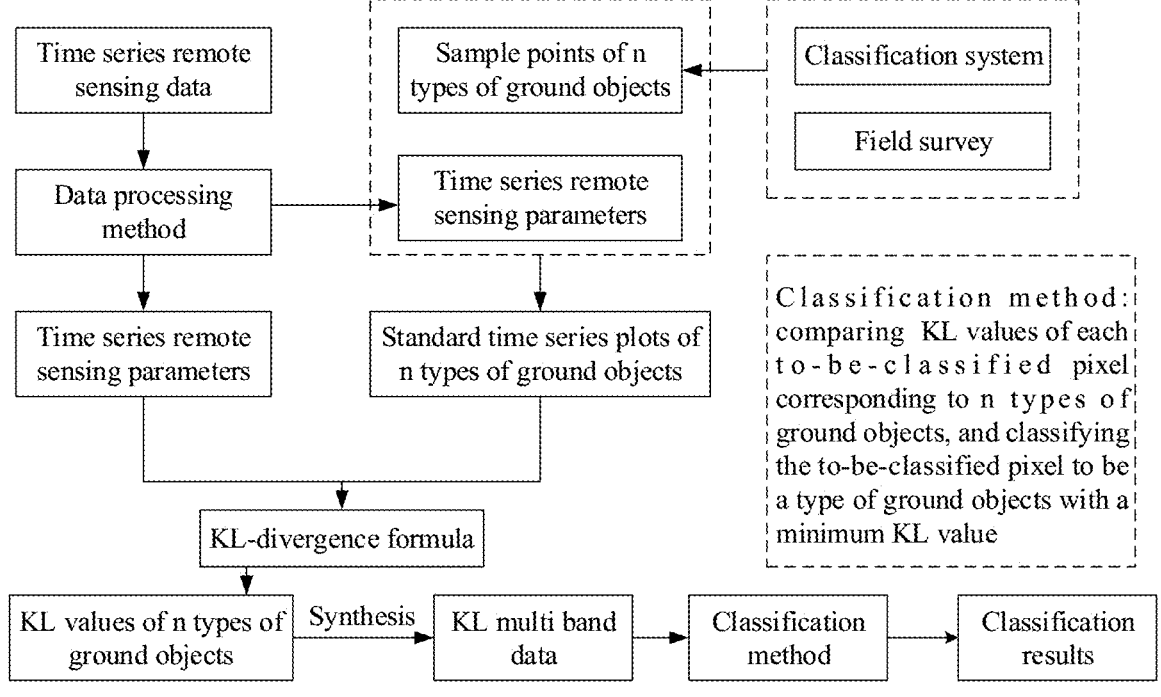
FIG. 1 illustrates a schematic flowchart of a remote sensing classification method based on relative entropy according to an embodiment of the disclosure.

As shown in FIG. 1, a remote sensing classification method based on relative entropy (also referred as to Kullback-Leibler divergence abbreviated KL divergence) is provided by the disclosure, including the following steps: firstly, determining sample points corresponding to n types of ground objects in a study area according to filed research or research experience combined with remote sensing images; secondly, calculating remote sensing data, which is formed in time series, to obtain corresponding series remote sensing parameters required by classification, such as normalized difference vegetation index (NDVI), thereby making the obtained series remote sensing parameters correspondingly form the time series; thirdly, extracting corresponding remote sensing parameter values from the series remote sensing parameters by utilizing the sample points of the n types of ground objects, and then calculating an average value of the remote sensing parameter values in the time series of the sample points, thereby obtaining a standard time series plot corresponding to each type of ground objects (i.e., the standard time series plot containing the calculated average values in the time series); fourthly, taking the standard time series plots of the n types of ground objects as a first distribution, taking time series data (also referred as to remote sensing parameter values) corresponding to each to-be-classified pixel in the series remote sensing parameters as a second distribution, calculating KL values for each to-be-classified pixel by using a KL-divergence formula, thereby generating data of a waveband for each type of ground objects; and fifthly, determining the calculated KL values in the series for the corresponding to-be-classified pixel and comparing the KL values of the to-be-classified pixel corresponding to the n types of ground objects, and then classifying the to-be-classified pixel to a type of ground objects with a minimum KL value and classifying all of the to-be-classified pixels, thereby obtaining classification results. Specially, the disclosure includes the following steps.

Step 1: sample points corresponding to n types of ground objects in a study area are determined according to field research and research experience, and then series remote sensing parameters are determined, specially, the series remote sensing parameters are used to identify characteristics of the n types of ground objects.

According to the identification characteristics capable of distinguishing types of the ground objects, a series remote sensing parameter data set is prepared, such as time series vegetation index data. Furthermore, the series remote sensing parameters can be used to identify the type of ground objects based on phase differences in growth and development of vegetation types. In addition, the series remote sensing parameter data set can also be series data formed by hyperspectral data that are capable of reflecting spectral curve differences among the n types of ground objects, thereby identifying the type of ground objects.

The determined sample points are used to distinguish different type of ground objects and what type of ground objects of the determined sample points are known to researchers through the field research. And then data (also referred as to the remote sensing parameter values) is extracted from the series remote sensing parameters by using the determined sample points as a basis for classification. A classification system includes 10 types of ground objects as described below. A specific processing method for the data can be divided into a method to synthesize the data of wave bands of the series remote sensing parameters and then to extract the remote sensing parameter values by using the sample points or a method of direct extraction.

For example, the time series remote sensing parameters are obtained from normalized difference vegetation index (NDVI) data of moderate-resolution imaging spectroradiometer (MODIS), thereby to reflect a temporal variation law of different ground object types. In an illustrated embodiment of the disclosure, the disclosure utilizes the NDVI data of MODIS added with blue band reflectance, red band reflectance, and near infrared band reflectance to form the series data, and then the classification for the 10 types of ground objects is carried out. Specially, the series data integrates the temporal variation characteristics and the spectral information, and therefore, the type of ground objects can be better recognized.

Step 2: based on the sample points, remote sensing parameter values corresponding to each type of the n types of ground objects are extracted from the series remote sensing parameters, a standard time series plot of each type of the n types of ground objects (i.e., the 10 types of ground objects in the classification system) is obtained according to the extracted remote sensing parameter values, and the standard time series plots of the n types of ground objects are taken as a first distribution.

A method for obtaining the standard time series plot includes the following steps:

step 21, obtaining pure pixel samples corresponding to the to-be-classified types of ground objects (also referred as to the 10 types of ground objects) according to field survey data or research experience; where the pure pixel sample refers to that a pixel is corresponding to one type of ground objects, and if the pixel is corresponding to more than two types of ground objects, the pixel is regarded as a mixed pixel; and choosing the pure pixel samples is a guarantee to making the sample point correspond to one type of ground objects;

step 22, extracting, based on the obtained pure pixel samples, the remote sensing parameter values corresponding to each type of the n types of ground objects from the series remote sensing parameters; and step 23, calculating an average value of the remote sensing parameter values corresponding to each type of the n types of ground objects, and obtaining the standard time series plot of each type of the n types of ground objects according to the average value.

The remote sensing parameter values for each type of ground objects are averaged to obtain the average value, thereby reflecting that this type of ground objects is more representative than a single sample point at a classification center of the series remote sensing parameters. Furthermore, each type of ground objects corresponds to a standard time series plot and the corresponding standard time series plot is considered as a true distribution of the corresponding type of ground objects. Strictly speaking, the standard time series plot can be said to be a "quasi-stationary distribution".

Figure 2:
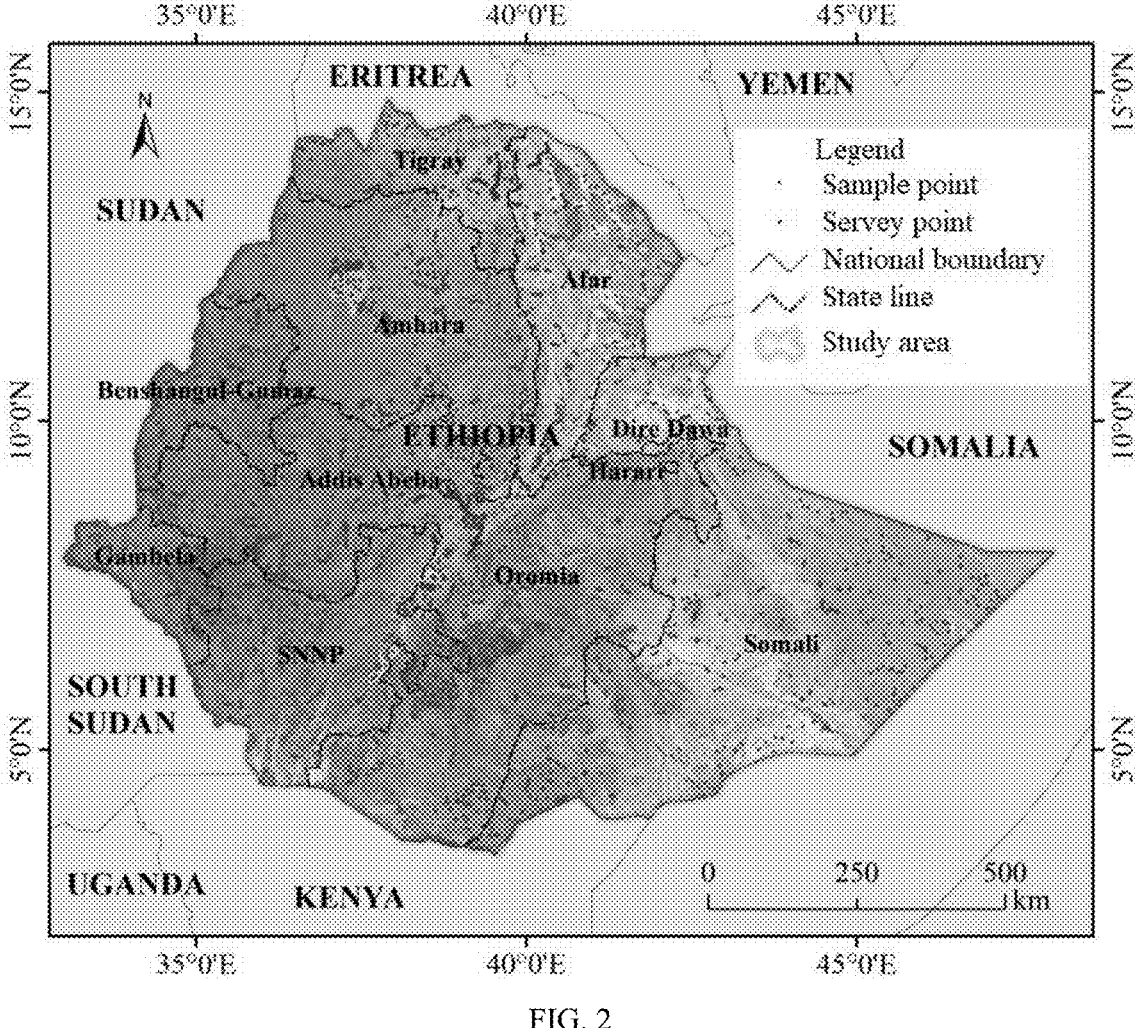
FIG. 2 illustrates a schematic diagram of sample data of a study area according to the embodiment of the disclosure.

In the embodiment, the disclosure utilizes the NDVI data of MODIS in time series and based on the field research and remote sensing images, the 10 types of ground objects are extracted (i.e., type 1 of an evergreen forest, type 2 of a deciduous forest, type 3 of a closed shrubland, type 4 of an open shrubland, type 5 of a woody savanna, type 6 of a savanna, type 7 of a grassland, type 8 of an agricultural land, type 9 of a water, and type 10 of a bare area) containing 1,775 sample points as shown in FIG. 2. Approximately half of the sample points (882) are used for the classification method, and other sample points are used for verification. The sample points for classifying the type of ground objects are used to extract the NDVI data of MODIS in time series, and then the average values thereof are calculated, thereby obtaining a standard NDVI curve (also referred as to the standard time series plot) of each type of ground objects as shown in FIG. 3.

Figure 3:
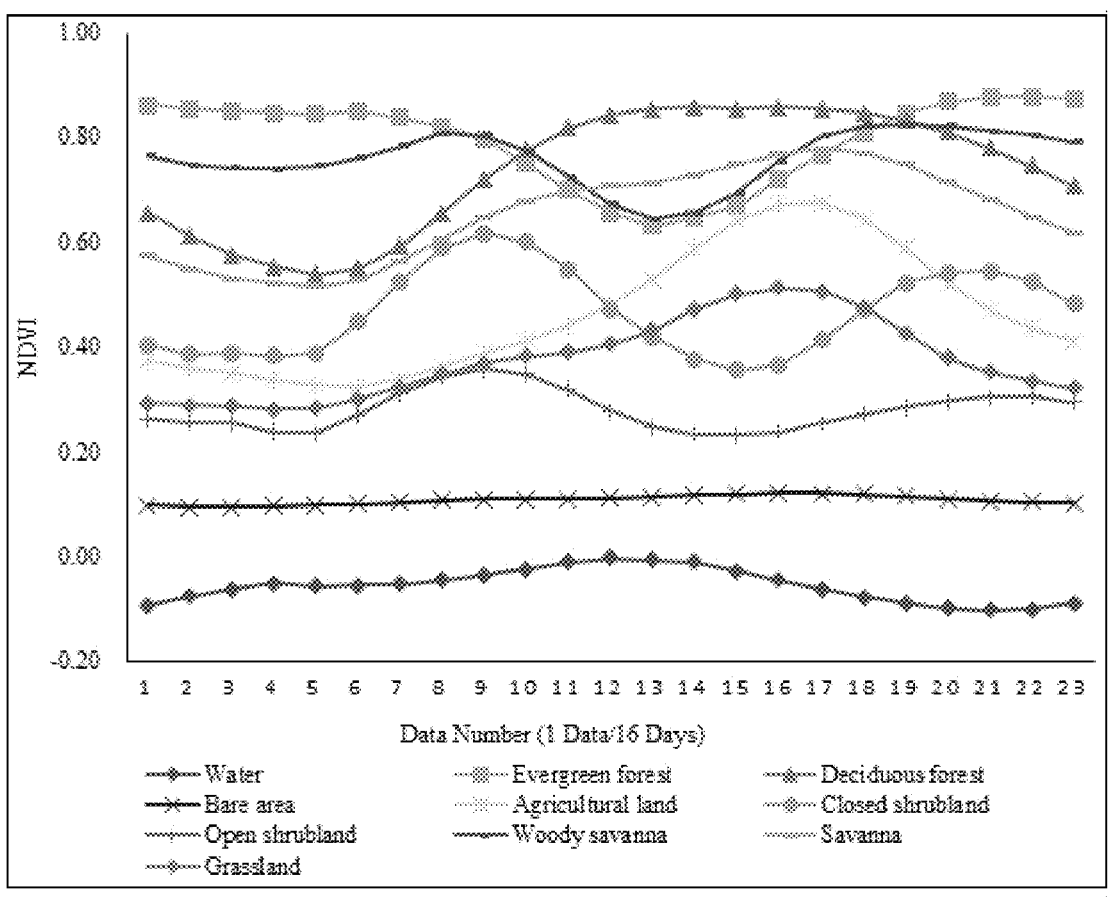
FIG. 3 illustrates a schematic diagram of standard time series plots of 10 types of ground objects in the study area according to the embodiment of the disclosure.

It can be seen from FIG. 3 that different vegetation types have significantly different growth variation characteristics, which is a basis for distinguishing ground object types. And the different growth variation characteristics are characterized in differences of variation laws of peaks and valleys of corresponding standard time series plots and differences of NDVI values of the corresponding standard time series plots.

Step 3: remote sensing parameter values corresponding to one of to-be-classified pixels of the study area are determined as a second distribution, based on the second distribution and the first distribution, KL values of the to-be-classified pixel corresponding to the n types of ground object are determined based on a KL-divergence formula, thereby obtaining a KL data layer, and then the KL values of all of the to-be-classified pixels of the study area are determined to obtain n KL data layers of the study area.

Specially, the KL-divergence formula is expressed as follows:

$$D_{KL}(P \parallel Q) = \sum_{i}^{n} P(i) \log \frac{P(i)}{Q(i)}. \tag{1}$$

In the KL-divergence formula (1), P represents the first distribution, that is, the standard time series plot of each type of the n types of ground objects; Q represents the second distribution, that is, a data series corresponding to each of the to-be-classified pixels; i represents a series number of the first distribution and the second distribution; $\parallel$ represents a symbol for conditional probability; $D_{KL}$ (P$\parallel$Q) is a representation of the conditional probability; $P_i$ and $Q_i$ represent an i-th parameter values, respectively, in the series remote sensing parameters; and n represents a number of the types of ground objects.

Due to the asymmetry of the KL divergence, i.e., $D_{KL}$ (P$\parallel$Q)$\neq D_{KL}$ (Q$\parallel$P), the KL value is generally represented by an average value of a forward KL-divergence and a reverse KL-divergence. Therefore, the KL value is calculated by the following formula:

$$KL = (D_{KL}(P \parallel Q) + D_{KL}(Q \parallel P))/2. \tag{2}$$

In the formula (2), KL represents the KL value, and $D_{KL}$(P$\parallel$Q) and $D_{KL}$(Q$\parallel$P) represent the forward KL-divergence and the reverse KL-divergence, respectively.

The standard time series plot of each type of ground objects in the first distribution is regarded as a distribution and the time series data of each to-be-classified pixel in the series remote sensing parameters is regarded as another distribution, thereby calculating the KL value. The calculated result for each type of ground objects is a layer or band including same row and column numbers as the original series remote sensing parameters. And if the number of the types of ground objects is n, there are n KL data layers.

Each standard time series plot can be regarded as the actual discrete distribution of the corresponding type of ground objects, and a set of time series parameters corresponding to each to-be-classified pixel can be regarded as another distribution, and a KL value between the to-be-classified pixel and the standard time series plot can be calculated by using the formula (2). Therefore, the KL values of the to-be-classified pixel relative to the n types of ground objects are calculated by using the method, thereby obtaining the KL data layer corresponding to the corresponding type of ground objects.

Since each to-be-classified pixel needs to be compared with the standard time series plots of all ground object types, in the embodiment, 10 KL data layers can be obtained, respectively corresponding to the 10 types of ground layers.

Step 4: n KL values of each of the to-be-classified pixels are compared, and the to-be-classified pixel is classified to be a type of ground objects with a minimum KL value; the above operation is performed on all of the to-be-classified pixels; and then classification results of the study area are obtained.

Figure 4:
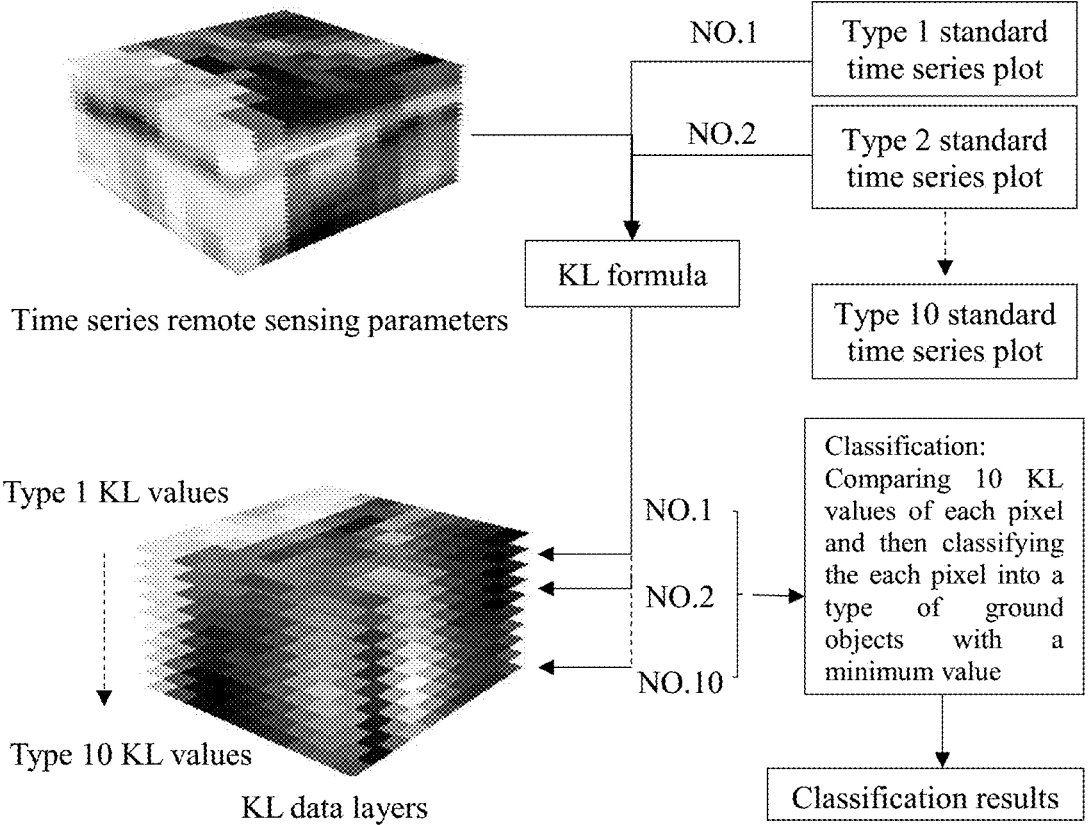
FIG. 4 illustrates a schematic diagram of the remote sensing classification method based on relative entropy according to the embodiment of the disclosure.

According to the calculated KL values, for each pixel, the n KL values corresponding to each pixel are compared, that is, this pixel is compared with the KL value formed by the standard time series plot of each type of ground objects, and then the pixel is assigned to the type of ground objects with the minimum KL value. The KL-divergence can measure the distance or proximity between the two discrete distributions. By comparing the KL values of each to-be-classified pixel relative to the n types of ground objects, the minimum KL value represents that the to-be-classified pixel is closest to the type of ground objects with the minimum KL value, and then this to-be-classified pixel is assigned to the ground object type. The above-mentioned determination is performed on every to-be-classified pixel in sequence, thereby obtaining the classification results of the study area. The classification process is shown in FIG. 4.

Figure 5:
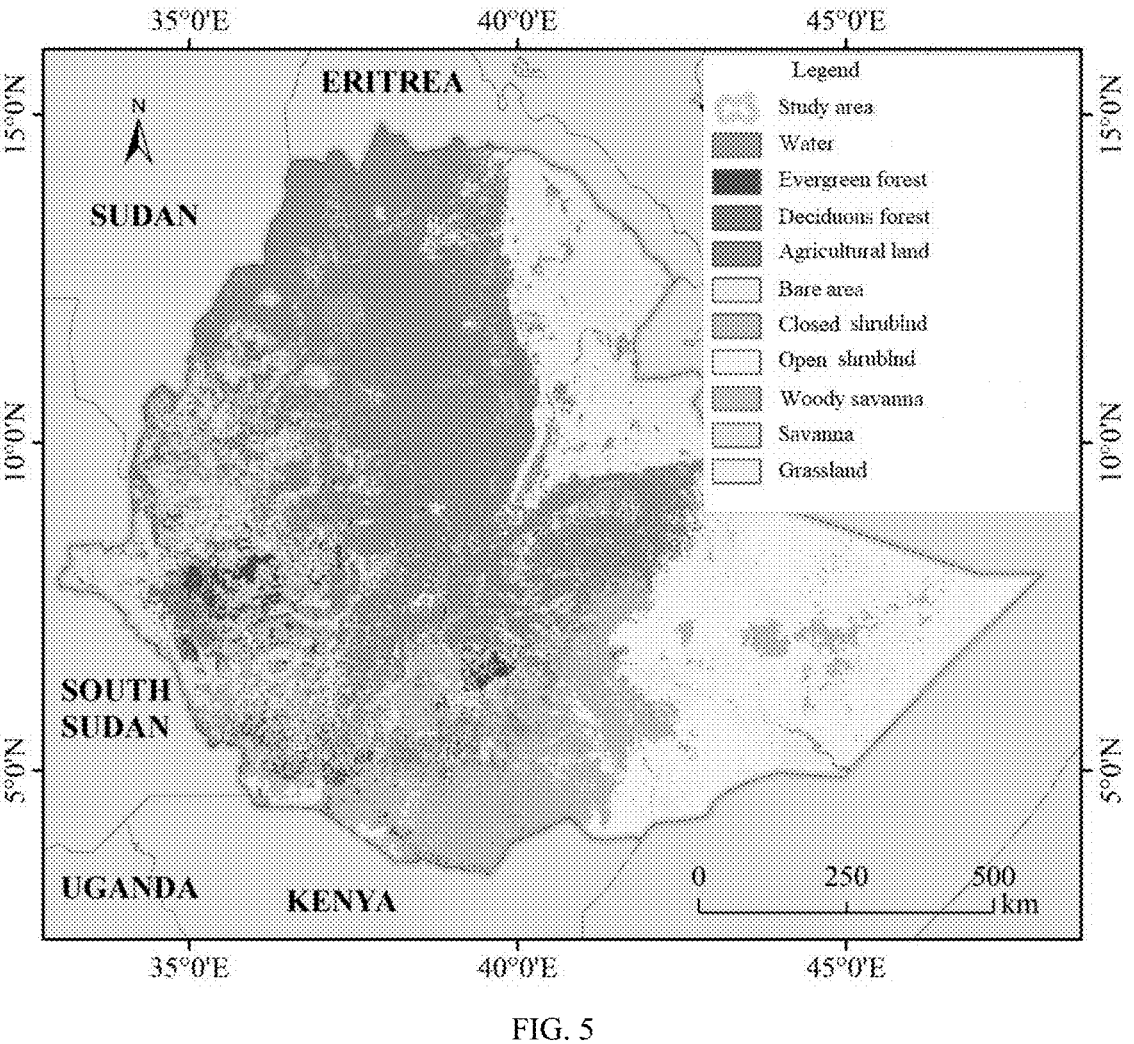
FIG. 5 illustrates a schematic diagram of classification results according to the embodiment of the disclosure.

Specifically, the classification results are shown in FIG. 5, and it can be seen therefrom that the distribution of different ground object types in the study area can be seen. In order to verify the accuracy of the remote sensing classification method for ground objects provided by the disclosure, the disclosure utilizes the other half of the sample points to analyze classification results based on confusion matrix method. Overall, the classification accuracy of the disclosure reaches 85.12%, and a kappa coefficient is 0.84.

Furthermore, the disclosure further includes the following steps: marking, based on the classification results, the n types of ground objects in a map of the study area for representing a distribution of the n types of ground objects in the study area and for guiding land planning, surface detection, and disaster relief of the study area, thereby achieving precision agriculture and disaster assessment, etc.

It can be seen from the verification results that using the method provided by the disclosure to develop the classification results for the ground objects achieves a very high accuracy, and can accurately reflect a real distribution pattern of the ground objects, especially in a large range of a whole national scale. Furthermore, the disclosure has a significant improvement in view of accuracies of the conventional methods reaching less than 80% under the same conditions.

In summary, the disclosure introduces the KL divergence measuring the distance between the two distributions used in the probability theory and the information theory into the remote sensing classification, and the ground object types are recognized by analyzing the "distance" between the to-be-classified pixels and the actual distribution. At the same time, the disclosure compensates for the assumptions that the conventional remote sensing classification methods require the ground objects to have normal distribution characteristics and pay excessive attention to morphological traits of curves, thereby achieving the higher accuracy. Therefore, the disclosure has important application values in the fields of ground object remote sensing classification, crop type recognition, hyperspectral remote sensing classification, etc. and also provides a new viewing angle and reference for remote sensing classification work. The data used in the disclosure can be time series remote sensing data, hyperspectral bands, various indexes, and combinations thereof, which has flexibility and is easy to actually monitor in the specific area scale. Therefore, the disclosure has a good popularization and application value.

The foregoing descriptions are merely illustrated embodiments of the disclosure and are not intended to limit the disclosure. Furthermore, any modification, equivalent replacement, improvement, etc. made within the spirit and principle of the disclosure shall fall within the scope of the protection of the disclosure.

What is claimed is:

1. A remote sensing classification method based on relative entropy, comprising the following steps:

step 1, determining sample points corresponding to n types of ground objects in a study area, and determining series remote sensing parameters, wherein the series remote sensing parameters are configured to identify characteristics of the n types of ground objects, and n=10;

step 2, extracting, based on the sample points, remote sensing parameter values corresponding to each type of the n types of ground objects from the series remote sensing parameters, obtaining a standard time series plot of each type of the n types of ground objects according to the extracted remote sensing parameter values, and taking the standard time series plots of the n types of ground objects as a first distribution;

step 3, taking remote sensing parameter values corresponding to to-be-classified pixels of the study area as a second distribution, determining, based on the second distribution and the first distribution, Kullback-Leibler (KL) values of the to-be-classified pixels corresponding to each type of the n types of ground objects by using a KL-divergence formula, and obtaining n KL layers of the study area according to the KL values of the to-be-classified pixels corresponding to the n types of ground objects; and step 4, comparing n KL values of each of the to-be-classified pixels, and classifying the to-be-classified pixel to be a type of ground objects with a minimum KL value of the n KL values, and thereby obtaining classification results of the study area and a distribution map of the n types of ground object in the study area.

2. The remote sensing classification method based on relative entropy as claimed in claim 1, wherein the series remote sensing parameters comprise time series remote sensing parameters for characterizing phase differences in growth and development of vegetation types or series data formed by hyperspectral data reflecting spectral curve differences among the n types of ground objects.

3. The remote sensing classification method based on relative entropy as claimed in claim 2, wherein the time series remote sensing parameters are obtained from normalized difference vegetation index (NDVI) data of moderate-resolution imaging spectroradiometer (MODIS), and the series data are obtained from the NDVI data of MODIS added with blue band reflectance, red band reflectance, and near infrared band reflectance.

4. The remote sensing classification method based on relative entropy as claimed in claim 1, wherein the step 2 further comprises the following steps:

step 21, obtaining pure pixel samples corresponding to the n types of ground objects according to field survey data or research experience;

step 22, extracting, based on the obtained pure pixel samples, the remote sensing parameter values corresponding to each type of the n types of ground objects from the series remote sensing parameters; and step 23, calculating an average value of the remote sensing parameter values corresponding to each type of the n types of ground objects, and obtaining the standard time series plot of each type of the n types of ground objects according to the average value.

5. The remote sensing classification method based on relative entropy as claimed in claim 4, wherein the n types of ground objects comprise an evergreen forest, a deciduous forest, a closed shrubland, an open shrubland, a woody savanna, a savanna, a grassland, an agricultural land, a water, and a bare area; and different growth characteristics of different vegetation types are characterized in differences of variation laws of peaks and valleys of corresponding standard time series plots and differences of NDVI values of the corresponding standard time series plots.

6. The remote sensing classification method based on relative entropy as claimed in claim 5, wherein the KL-divergence formula is expressed as follows:

$$D_{KL}(P \| Q) = \sum_i^n P(i) \log \frac{P(i)}{Q(i)},$$

where P represents the first distribution, that is, the standard time series plot of each type of the n types of ground objects; Q represents the second distribution, that is, a data series corresponding to each of the to-be-classified pixels; i represents a series number of the first distribution and the second distribution; and n represents the n types of ground objects in a classification system; and wherein a KL value is an average value of a forward KL-divergence and a reverse KL-divergence and a calculation formula of the KL value is expressed as follows:

$$KL = (D_{KL}(P \| Q) + D_{KL}(Q \| P))/2,$$

where KL represents the KL value, and $D_{KL}(P\|Q)$ and $D_{KL}(Q\|P)$ represent the forward KL-divergence and the reverse KL-divergence, respectively.

7. The remote sensing classification method based on relative entropy as claimed in claim 6, wherein the KL values corresponding to each type of the n types of ground objects are configured to form a layer or band with same row and column numbers as the series remote sensing parameters, and the KL values of the to-be-classified pixels corresponding to a type of the n types of ground objects are calculated to obtain a KL data layer of the corresponding type of ground objects, as the KL layer.

8. The remote sensing classification method based on relative entropy as claimed in claim 1, further comprising the following steps:

marking, based on the classification results, the n types of ground objects in a map of the study area for representing a distribution of the n types of ground objects in the study area and for guiding land planning, surface detection, and disaster relief of the study area.

9. A remote sensing classification method based on relative entropy, comprising the following steps:

step 1, determining sample points corresponding to n types of ground objects in a study area, and determining series remote sensing parameters, wherein the series remote sensing parameters are configured to identify characteristics of the n types of ground objects, n is a positive integer greater than 1, the series remote sensing parameters comprise series data formed by hyperspectral data reflecting spectral curve differences among the n types of ground objects, and the n types of ground objects comprise an evergreen forest, a deciduous forest, a closed shrubland, an open shrubland, a woody savanna, a savanna, a grassland, an agricultural land, a water, and a bare area;

step 2, extracting, based on the sample points, remote sensing parameter values corresponding to each type of the n types of ground objects from the series remote sensing parameters, obtaining a standard time series plot of each type of the n types of ground objects according to the extracted remote sensing parameter values, and taking the standard time series plots of the n types of ground objects as a first distribution;

step 3, taking remote sensing parameter values corresponding to to-be-classified pixels of the study area as a second distribution, determining, based on the second distribution and the first distribution, KL values of the to-be-classified pixels corresponding to each type of the n types of ground objects by using a KL-divergence formula, and obtaining n KL layers of the study area according to the KL values of the to-be-classified pixels corresponding to the n types of ground objects; and step 4, comparing n KL values of each of the to-be-classified pixels, and classifying the to-be-classified pixel to be a type of ground objects with a minimum KL value of the n KL values, and thereby obtaining classification results of the study area.

* * * * *